United States Patent [19]

Jelbart

[11] Patent Number: 4,607,740
[45] Date of Patent: Aug. 26, 1986

[54] MOBILE GRAIN AUGER

[76] Inventor: John E. Jelbart, "Rainbow", Pleasant Hills, New South Wales 2658, Australia

[21] Appl. No.: 652,090

[22] Filed: Sep. 19, 1984

[30] Foreign Application Priority Data

Sep. 19, 1984 [AU] Australia .............................. PG1468

[51] Int. Cl.⁴ .............................................. B65G 41/00
[52] U.S. Cl. .................................... 198/320; 198/861.5
[58] Field of Search ............. 198/320, 318, 312, 863, 198/861.5, 319

[56] References Cited

U.S. PATENT DOCUMENTS

| 2,692,040 | 10/1954 | Deverall | 198/320 |
| 2,702,113 | 2/1955 | Bobrowski | 198/320 |
| 2,792,103 | 5/1957 | Piemont | 198/320 |
| 4,000,805 | 1/1977 | Hadler | 198/320 |
| 4,171,040 | 10/1979 | Nickol | 198/320 X |
| 4,351,428 | 9/1982 | Long | 198/318 X |
| 4,369,871 | 1/1983 | Patten et al. | 198/320 |

FOREIGN PATENT DOCUMENTS 514507 7/1955 Canada .............................. 198/318

Primary Examiner—Joseph E. Valenza
Assistant Examiner—Jonathan D. Holmes
Attorney, Agent, or Firm—David W. Selesnick

[57] ABSTRACT

A mobile grain auger on a wheeled frame has a reaction member positioned to engage the ground between the axis of the wheels and the intake end of the auger casing, and a tilt adjustment mechanism connected between the reaction member and the frame to vary the inclination of the casing to the ground.

5 Claims, 4 Drawing Figures

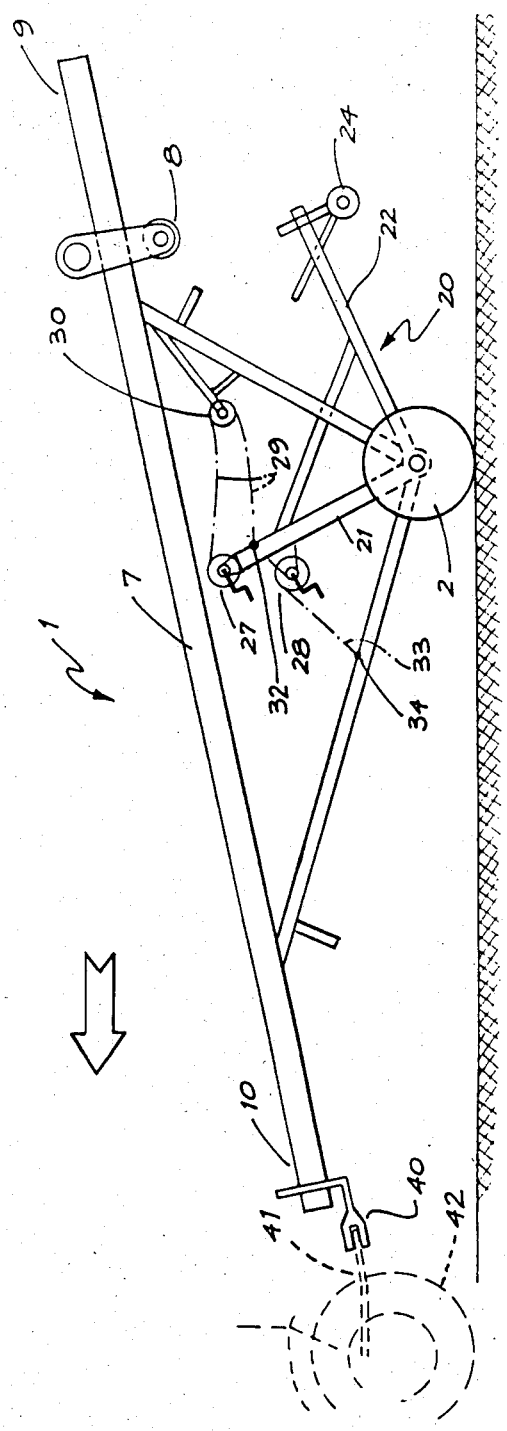

MOBILE GRAIN AUGER

FIELD OF THE INVENTION

This invention relates to a mobile apparatus such as an elongated belt conveyor (known as an elevator), or a mobile grain auger used to convey grain to or from a grain storage hopper.

STATE OF THE ART

A typical mobile grain auger may have a length of forty feet and comprises a cylindrical casing of about nine inches diameter containing a helicoidal auger flight which is motor driven and protrudes for as much as eight inches from an intake end of the casing. The casing is mounted to a caliper frame formed by two triangular struts. The struts are connected at their lower ends to an axle carrying a pair of spaced coaxial wheels and are hinged to one another to enable the calliper angle between them to be varied. The spaced upper ends of the legs support the casing at different positions along its length and one of them bears on a slider beneath the casing. A hand winch on one of the legs controls the tension of a cable passing around a pulley on the other leg so that the calliper angle can be varied by operating the winch, to alter the height of the casing above the wheels.

A mobile auger may weigh upwards of a thousand pounds and may require three men to position it. The height of a grain storage silo varies from one silo to another and some have their discharge opening beneath, while others have it positioned at one side. The discharge opening normally has a cover which must be removed to give access to one end of a tube which projects down into the silo for about two feet. The intake end of the casing must be aligned with the tube and then thrust into it so that approximately two feet of the intake end of the auger are buried in the grain inside the silo.

The manoeuvring of the auger to ensure it is at the correct height and angle to enter the silo is achieved by tilting the support frame about the wheels and adjusting the calliper angle. The auger must then be bodily manhandled towards the silo. The operation is both laborious and time-consuming.

OBJECT OF THE INVENTION

An object of the invention is to provide apparatus for enabling a mobile grain auger to be more easily and quickly manoeuvred.

SUMMARY OF THE INVENTION

A mobile grain auger of the invention has a reaction member positioned to engage the ground between the axis of the wheels and the intake end of the auger casing, and a tilt adjustment mechanism connected between the reaction member and the support frame to vary the inclination of the casing to the ground in a controlled manner.

The mobile grain auger of the invention has the advantage that it is no longer necessary for its weight to be carried manually when it is fitted to a discharge opening of a silo, as the height of the casing can be adjusted in the conventional manner and the inclination of the casing to the ground separately adjusted by means of the tilt mechanism.

PREFERRED FEATURES OF THE INVENTION

Preferably the member carries a ground wheel at its lower end and is rotatable about a vertical axis to enable the wheel axis to turn horizontally. A wheel lock may be used to lock the wheel axis at a chosen position so that the auger will only move in a particular direction.

Conveniently the reaction member is mounted at one end of a lever assembly pivotted to turn about the common axis of the pair of coaxial wheels. The lever may be of bell-crank shape and have the tilt mechanism at its other end. Such mechanism suitably comprises a winch connected by a cable to the leg of the frame nearer the intake end of the auger. The advantage of the bell crank lever configuration is that it may be turned between an operating position at which the reaction member rests on the ground, and a stowage position at which the member is raised to allow the weight of the auger to be carried by the pair of wheels during towing. In the preferred construction a hand winch is used to move the lever between the two positions.

Suitably the ground wheel of the reaction member is provided with a drive unit conveniently provided by a ratchet drive operated by a handle. This can be used to move the auger bodily towards and away from the silo when its weight is carried on all three wheels.

The invention will now be described in more detail, by way of example, with reference to the accompanying partly diagrammatic drawings, in which:

IN THE DRAWINGS

FIG. 4 shows the auger in side elevation with a lever partially raised to a position it occupies during towing of the auger behind a vehicle.

DESCRIPTION OF PREFERRED EMBODIMENT

Figure 1:
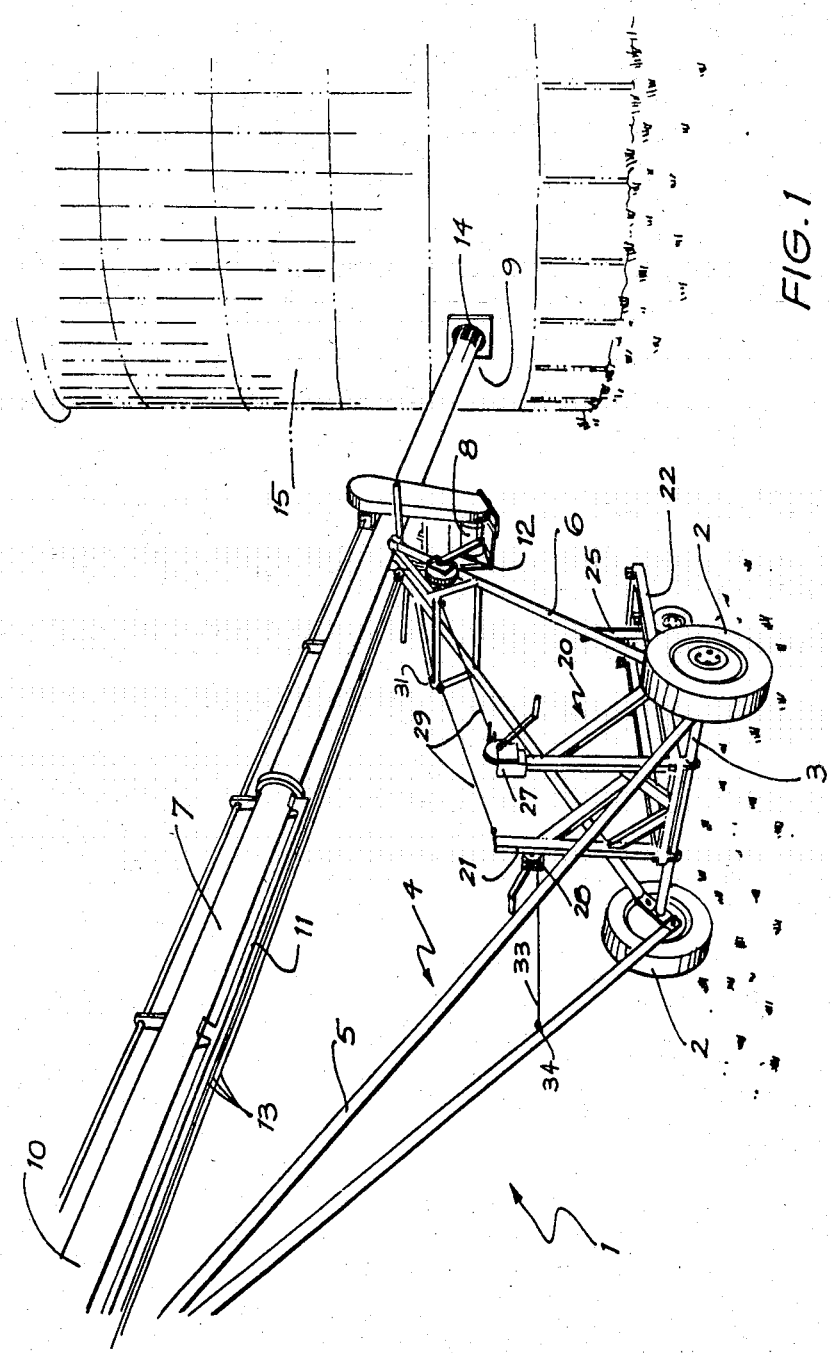
FIG. 1 is a perspective elevation of a mobile grain auger in an operating position to withdraw grain from a silo discharge opening.

FIG. 1 shows a mobile grain auger 1 having wheels 2 mounted at opposite ends of an axle 3. A calliper frame 4 having two upwardly divergent legs 5 and 6, supports a cylindrical casing 7 containing a helicoidal auger flight (not shown). The flight is rotated about its axis by a motor 8 to convey grain along the casing 7 between its intake end 9 and its discharge end 10. A slide rail 11 extends longitudinally beneath the discharge end 10 and is engaged by the upper end of the leg 5. The upper end of the leg 6 is attached to a pivot point on the casing 7.

A hand winch 12 is located towards the upper end of the leg 6 and controls the tension in a cable 13 which passes beneath the casing 7 and around a pulley (not shown) at the top of the other leg 5 so that, by altering the tension in the cable 13, the calliper angle between the legs 5 and 6 may be varied and thus the spacing between the casing 7 and the axle 3. Thus the height of the auger can be controlled. The auger so far described is currently available in Australia and is manufactured by J. B. Manufacturing Pty. Ltd. of Yennora, Sydney, New South Wales, Commonwealth of Australia, and is sold under the brand name "FAST FLOW".

FIG. 1 shows the auger 1 inclined downwardly with its intake end 9 passing through a discharge opening 14 of a grain silo 15. The opening is at the upper end of a tube (not shown) sloping downwardly towards the floor of the silo and about two feet long. The purpose of the tube, which is usually fitted to the inside of a grain silo opening, is to prevent the grain stored in the silo from flowing out through the discharge opening when its cover is opened, while enabling an end of an auger to be inserted into the grain inside the silo beyond the end of the tube. The intake end 9 passes through the tube so that a short length of the exposed end of the helicoidal flight projects into the grain inside the silo and conveys it upwardly through the cylindrical casing 7 when the motor 8 is operated.

Figure 2:
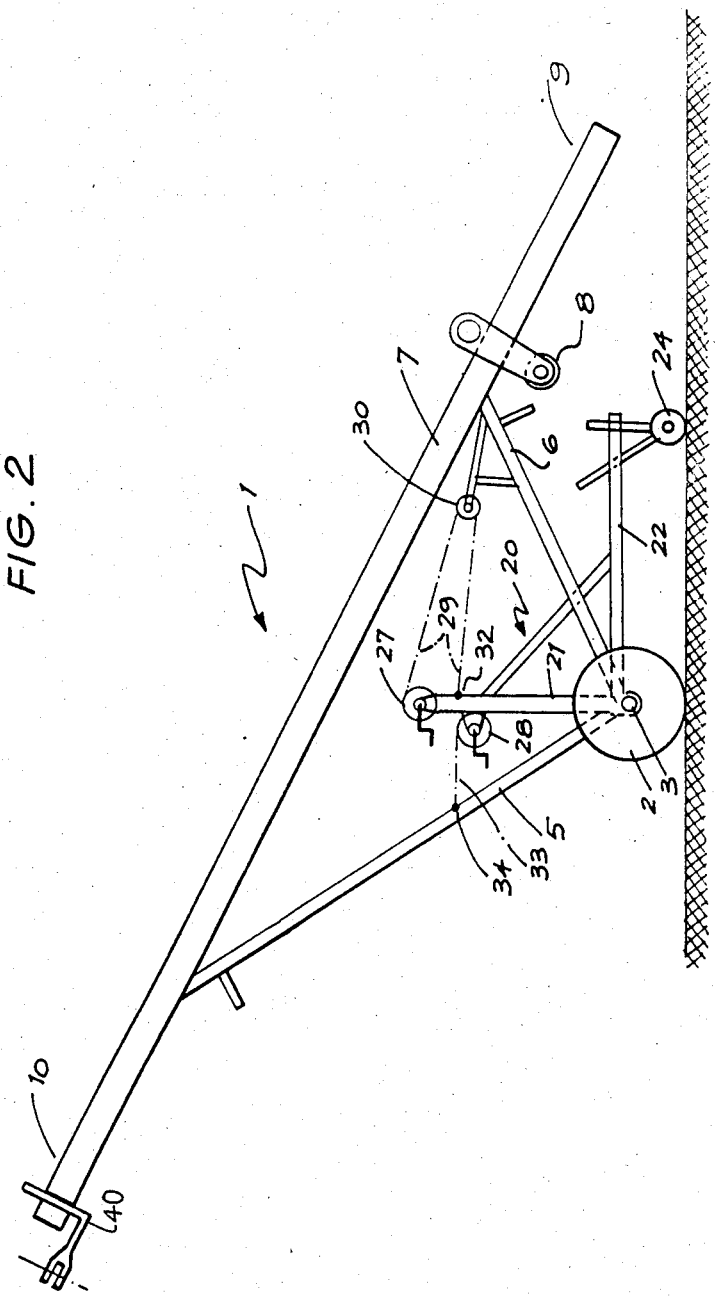
FIG. 2 is a diagrammatic side view of the auger of FIG. 1.
Figure 3:
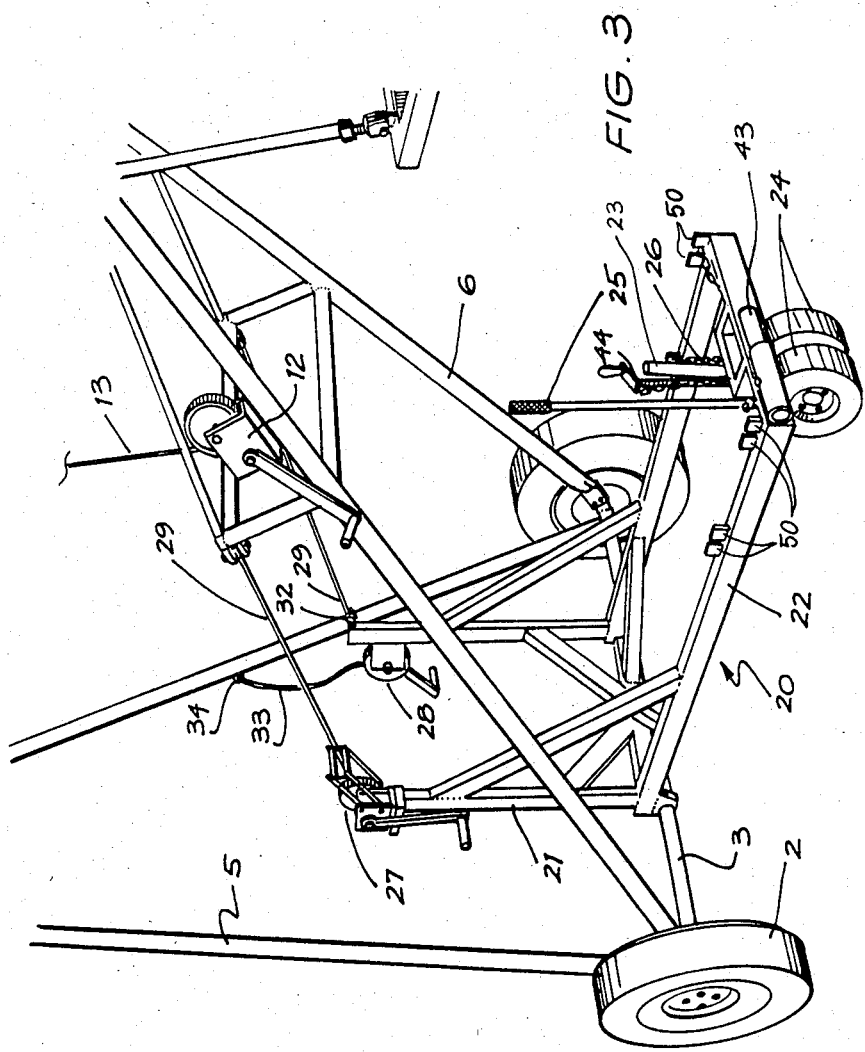
FIG. 3 is a perspective view of a detail of FIG. 1 viewed from the intake end of the auger.

Referring jointly to FIGS. 2 and 3, it will be seen that a bell-crank lever 20 having two limbs 21 and 22 is mounted on the axle 3 which provides a fulcrum for rotation of the lever 20 from its operating position, shown in FIGS. 2 and 3, to its stowage position and occupied when the auger is being transported between sites of use. When the lever 20 is in its normal stowage position its limb 22 extends along the leg 6.

The lever 20 is vertically rotatable about its fulcrum and, when lowered to the position shown in FIG. 3 has limb 21 upright and limb 22 horizontal. A spindle providing a reaction member 23 is mounted at the free end of the limb 22 and carries at its lower end two closely-spaced ground wheels 24 mounted on a common shaft (not shown) which carries a rack wheel (also not shown). An upright handle 25 is pivotted alongside the rack wheel and carries a pair of hinged pawls which can selectively engage the teeth of the rack wheel to impart a drive in the desired direction to the ground wheels 24 when the handle is moved back and forth.

The vertical spindle providing the reaction member 23 is free to rotate horizontally but may be locked in a chosen position by engaging a chain 26 (shown in FIG. 3) with catches 50 provided on the sides of the horizontal limb 22.

The vertical limb 21 of the lever 20 carries two winches 27 and 28, respectively, at its upper end. The winch 27 provides a tilting mechanism for the auger by controlling the tension in a cable 29 which passes around a pair of pulleys 30. These are carried by a lateral frame 31 (shown in FIG. 1) on the leg 6. The cable 29 then returns to an anchorage 32 on the upright limb 21.

The second winch 28 is used to move the lever 20 between the operating position shown in FIG. 3 and the stowage position. Like the winch 27, it is handle operated and is connected by a cable 33 to an anchorage point 34 on the leg 5.

The auger is provided at its discharge end 10 with a towing bracket 40 which, as shown in FIG. 4, is hitched to a tow bar 41 of a towing vehicle depicted by a tractor wheel 42. During towing, the lever 20 is held in its stowage position by operation of a slide bolt 43, shown in FIG. 3 which engages the upper surface of the leg 6.

OPERATION OF THE PREFERRED EMBODIMENT

The auger is towed to the vicinity of the silo 15 and unhitched from the tow-bar 41. As the intake end 9 is heavier, it is lowered to ground level. The bolt 43 is slid back to the position shown in FIG. 3 so that the lever 20 can turn on the axle 3 under the control of the tension in the cable 33.

The winch 28 is operated to release the cable 33 gradually, so that the weight of the lever 20 causes it to rotate until the wheels 24 are on the ground. The winch 28 is left in the free-running condition so that it can pay out more cable 33 as required.

The winch 27 is next operated to draw in the cable 29. This pulls the frame via the leg 6 towards the upright limb 21 of the lever 20 which is prevented from moving by the engagement of the wheels 24 on the ground between the towing wheels 2 and the intake end 9 of the auger. The calliper frame 4 therefore turns about the axle 3 to bring the casing 7 towards the horizontal position.

The pawls of the handle 25 are engaged with the rack wheel, and the handle is operated to inch the auger forwards until its intake end 9 is close to the discharge opening 14 of the silo 15.

The hand winch 27 is operated to alter the height of the casing 7 so that the intake end 9 is opposite the opening 14 so that it can be readily inserted into it. If adjustment of the height of the discharge end 10 has to be carried out, this can be done by means of the winch 12 which controls the caliper angle between the legs 5 and 6. The auger tilts about its lower end. The intake end 9 can then be pushed through the opening 14 and down the aforesaid tube. During this movement further minor adjustment of the height and tilt of the casing 7 may be necessary until the auger reaches the operating position. The motor 8 is then started.

At the end of the discharge sequence the auger is withdrawn from the silo opening 14. The winch 12 is operated to return the casing 7 to a desired height, if necessary. The auger may be turned, this being permitted by rotation of the member 23, to bring it into alignment with the towing vehicle so that the auger can be hitched to the tow bar 41. The winch 27 is then operated to tighten the cable 29 so that the casing is tilted to bring the towing bracket 40 to the same height as the tow bar 41.

The winch 28 is operated to turn the lever 20 about the axle 3 to its stowage position so that the wheels 24 are lifted through the intermediate position shown in FIG. 4 and the auger's weight is carried by the wheels 2. The slide bolt 43 is then operated to lock the limb 22 to the leg 6.

As long as the intake end of the casing is heavier than the other end, the winch 27 can also be used to bring the discharge end to ground level, by tightening the cable 29 running from the winch. This is also done in a controlled manner.

MODIFICATIONS TO PREFERRED EMBODIMENT

In place of the winches hydraulically operated rams can be used.

Although it is preferred to equip the reaction member with wheels 24 to make manoeuvring easier, this is not essential as a skid or simply a pad may be used to provide the necessary reaction to prevent the lever 20 turning when adjusting the tilt of the auger.

The lever and reaction member may be made and sold separately from the auger. Also, the invention is applicable to a belt elevator which comprises a conveying belt travelling around an elongated frame and used to convey material, such as bales, between different levels. It is normally provided beneath with a support frame and wheels, similar to those used with the auger described above, and the lever and reaction member can be used to control the tilt in the same way.

I claim:

1. A mobile grain auger comprising an elongated cylindrical casing having an intake end and a discharge end, a helicoidal auger flight extending through the casing, a motor to rotate the flight to convey grain from the intake end to the discharge end of the casing, two legs defining a calliper frame and having their divergent ends extending upwardly and supporting the casing at spaced positions along its length, a pair of coaxial ground wheels supporting a horizontal pivotal axis about which the frame is tiltable in a vertical plane, first adjustment means formed by a first winch and cable operable to change the calliper angle, a lever including vertically and horizontally extending limbs fulcrummed to said horizontal pivotal axis and a reaction member on said horizontally extending limb positioned to engage the ground between the common axis of the wheels and the intake end of the casing, said vertically extending limb being disposed between said legs of said calliper frame, and tilt adjustment means formed by a second winch and cable connected between the calliper frame and the lever and operable to vary the slope of the casing in a a controlled manner.

2. An auger as claimed in claim 1, in which said second winch and cable is further operable to displace the lever between an operating position at which the reaction member engages the ground, and a stowage position at which the reaction member is held clear of the ground.

3. An auger as claimed in claim 2, in which the lever is a bell-crank lever having said vertically extending limb to which the second adjustment means are attached, and said horizontally extending limb carrying the reaction member at its end.

4. A mobile elevator comprising an elongated structure supporting a belt loop having an intake end and a discharge end, a motor to drive the upper run of the belt from the intake end to the discharge end, two legs defining a calliper frame lying in the vertical plane and having their divergent upper ends extending upwardly and supporting the structure at spaced positions along its length, a pair of coaxial ground wheels supporting a horizontal pivotal axis about which the frame is tiltable in a vertical plane, first adjustment means formed by a first winch and cable and operable to change the calliper angle, a lever including vertically and horizontally extending limbs fulcrummed to said horizontal pivotal axis and a reaction member on said horizontally extending limb positioned to engage the ground between the common axis of the wheels and the heavier intake end of the elongated structure, said vertically extending limb being disposed between said legs of said calliper frame, and tilt adjustment means formed by a second winch and cable and connected between the calliper frame and the lever and operable to vary the slope of the structure and, thus, the belt in a controlled manner.

5. An elevator as claimed in claim 4, in which said second winch and cable is further operable to displace the lever between an operating position at which the reaction member engages the ground, and a stowage position at which the reaction member is held clear of the ground.

* * * * *